US007500750B2

(12) United States Patent
Sabeta

(10) Patent No.: US 7,500,750 B2
(45) Date of Patent: Mar. 10, 2009

(54) METHOD AND SYSTEM FOR TRACKING THE WEARABLE LIFE OF AN OPHTHALMIC PRODUCT

(76) Inventor: Anton Sabeta, 283 Danforth Ave., Suite 184, Toronto, Ontario (CA) M4K 1N2

( * ) Notice: Subject to any disclaimer, the term of this patent is extended or adjusted under 35 U.S.C. 154(b) by 237 days.

(21) Appl. No.: 11/419,978

(22) Filed: May 23, 2006

(65) Prior Publication Data

US 2006/0267768 A1 Nov. 30, 2006

Related U.S. Application Data

(60) Provisional application No. 60/683,723, filed on May 24, 2005.

(51) Int. Cl.
*G02C 7/02* (2006.01)

(52) U.S. Cl. ...................................... 351/177; 351/158

(58) Field of Classification Search ................. 351/177, 351/158

See application file for complete search history.

(56) References Cited

U.S. PATENT DOCUMENTS

| | | | | |
|---|---|---|---|---|
| 5,328,597 | A * | 7/1994 | Boldt et al. | 210/87 |
| 6,038,997 | A * | 3/2000 | Madden | 116/308 |
| 6,382,409 | B1 * | 5/2002 | Scala | 206/5.1 |
| 6,885,818 | B2 * | 4/2005 | Goldstein | 396/59 |

* cited by examiner

*Primary Examiner*—Jordan M. Schwartz

(57) ABSTRACT

A method for tracking the wearable life of an ophthalmic product, the method comprising the steps of: providing the ophthalmic product with at least one data carrier for carrying data related to the ophthalmic product, the data carrier having a first device operable in a magnetic and/or electrical mode; providing an activation signal from an external means; activating the first device with the activation signal to cause the first device to emit the data in response to the activating signal; recording the time the first device is interrogated, processing the received data to determine the wearable life of the ophthalmic product based on the lapsed time.

20 Claims, 5 Drawing Sheets

METHOD AND SYSTEM FOR TRACKING THE WEARABLE LIFE OF AN OPHTHALMIC PRODUCT

CROSS-REFERENCE TO RELATED APPLICATIONS

This application claims the benefit of priority to U.S. Provisional Application Ser. No. 60/683,723, filed May 24, 2005.

BACKGROUND OF THE INVENTION

1. Field of the Invention

The present invention relates to a method and system for tracking the wearable life of an ophthalmic product.

2. Description of the Prior Art

The contact lens market in the United States is a multi-billion dollar market. Recent data indicate that nearly 36 million Americans—almost 13% of all Americans wear contact lenses. There are numerous manufacturers of contact lenses and many different channels of distribution, including eye care practitioners (e.g., ophthalmologists and optometrists), national and regional optical chains, mass merchants, and mail order and Internet firms. The contact lenses include any of the following basic types: soft, rigid gas permeable and hard. Soft contact lenses are made of a highly flexible material that contains water or silicone or hydrophilic hydrogels, oxygen can reach the eye when soft contacts are used. Rigid gas permeable contact lenses, frequently referred to as RGP contact lenses, are composed of a firm plastic material and do not contain water. RGP lenses permit oxygen to pass directly through the lens to the eye so that it may “breathe.” Because they transmit oxygen, these lenses are referred to as gas permeable. Hard contact lenses are made of a hard plastic material. Hard lenses, also called PMMA lenses, were the first mass-market contact lenses. Unlike RGP lenses, PMMA lenses do not allow oxygen to pass through the lens to the eye.

Contact lenses are often manufactured with identifying marks useful for indicating which contact lens goes into which eye, or indicating serial numbers, lot and batch numbers, and optical powers. The methods for providing identifying marks are well known in the machine tooling and contact lens field, for example, using a laser, electrical discharge, machining, mechanical scribing, diamond scribing, ultrasonic scribing, holographic marking, and scattering by surface disruption. These markings such as brand name, on the edge may help to identify between the right and left contact lenses.

In most countries, contact lenses are classified as medical devices, as such they are normally dispensed with only with a valid prescription from a qualified eyecare practitioner. For example, in the United States a contact lens is a FDA-regulated product. A valid prescription typically includes user’s name, eye practitioner’s name, contact lens brand name and material, lens measurements such as power, diameter and base curve, directions for safe use such as wearing schedule, whether lenses are for daily or extended wear, the number of refills, whether lens material substitutions are allowed and an expiration date. Also, since eyes change all the time, such prescriptions do not last forever, with most having an expiration date, and thus should be updated periodically. Each lens manufacturer has a replacement schedule of a contact lens, that is, how long the lenses can be safely worn before discarding. The replacement schedule depends on the manufacturer or the type of lens chosen.

For example, RGPs last several years, while soft contact lenses come in a wider variety of replacement schedules:

daily disposable—1 day, disposable (extended wear)—1 week to 1 month, disposable (daily wear)—2 weeks, frequent replacement (also called “planned replacement”), 1 month to several months, depending on brand, conventional 1-year. Contact lenses are available for two different wear schedules: daily wear, meaning they should be removed before sleeping & extended wear, or overnight wear. Also, with planned-replacement lenses, an eye care practitioner works out a replacement schedule tailored to each user’s needs. For example, for users who produce a higher level of protein in their eyes or don’t take as good care of their lenses, it might be healthier to replace the lenses more frequently. Therefore, the onus to keep track of the wearable life of the lenses falls on the user. As such, if a user does not record the date of first use, as time passes it can become difficult to recall how long a particular pair of contact lenses has been worn.

Despite recommendations by eye care practitioners to replace lenses as specified in the prescriptions, most users continue to use these lens well past the expiration date or replacement date, whether unwittingly or otherwise. Such practices present a very serious safety concern with contact lenses. Extended-wear (overnight) contact lenses, rigid or soft, increase the risk of corneal ulcers, infection-caused eruptions on the cornea that can lead to blindness. Symptoms include vision changes, eye redness, eye discomfort or pain, and excessive tearing. Another sight-threatening concern is the infection Acanthamoeba keratitis, caused by improper lens care. This difficult-to-treat parasitic infection’s symptoms are similar to those of corneal ulcers.

Several solutions have been presented in the prior art, however these solutions place the onus of tracking the day-to-day wear of the lenses on the user.

It is thus one of the objects of this invention to mitigate or obviate at least one of the aforementioned disadvantages.

SUMMARY OF THE INVENTION

In one of its aspects the present invention provides a method for tracking the wearable life of an ophthalmic product, the ophthalmic product having expiration data, the method comprising the steps of: providing on or within the ophthalmic product with at least one data carrier for carrying data related to the ophthalmic product, the data carrier having a first device operable in a magnetic and/or electrical mode; providing an activation signal from an external means; activating the first device with the activation signal to cause the first device to emit the data in response to the activating signal; recording the time the first device is activated; processing the received data to determine the wearable life of the ophthalmic product, based on the lapsed time between the time of activation and the expiration data: wherein the ophthalmic product is one of a contact lens, an intra-ocular lens, or a lens for eyeglasses.

In another of its aspects the present invention provide a system for tracking the wearable life of an ophthalmic product, the system comprising: said ophthalmic product having thereon or within it a data carrier for carrying data related to said ophthalmic product, said data comprising lens expiration data, said data carrier having a first device operable in a magnetic and/or electrical mode to emit said data in response to activation by an activating signal applied by an external means; said external means having receiving means for receiving said emitted data, counter means for recording the time of activation; and logic means for processing said received data to determine the lapsed time between said time of activation and expiration data, wherein the wearable life of an ophthalmic product is based on the lapsed time, wherein said ophthalmic product is one of a prescription contact lens, a prescription lens for eyeglasses, or an intra-ocular lens.

Advantageously, tracking the life of a lens would be beneficial to the user as this helps to ensure that the prescription remains current and that the lens is replaced as prescribed. Additionally, this helps to prevent potential eye infections resulting from bacteria build up on a lens surface due to prolonged wear, as well as degradation of a wearer's eyesight due to lens deterioration.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
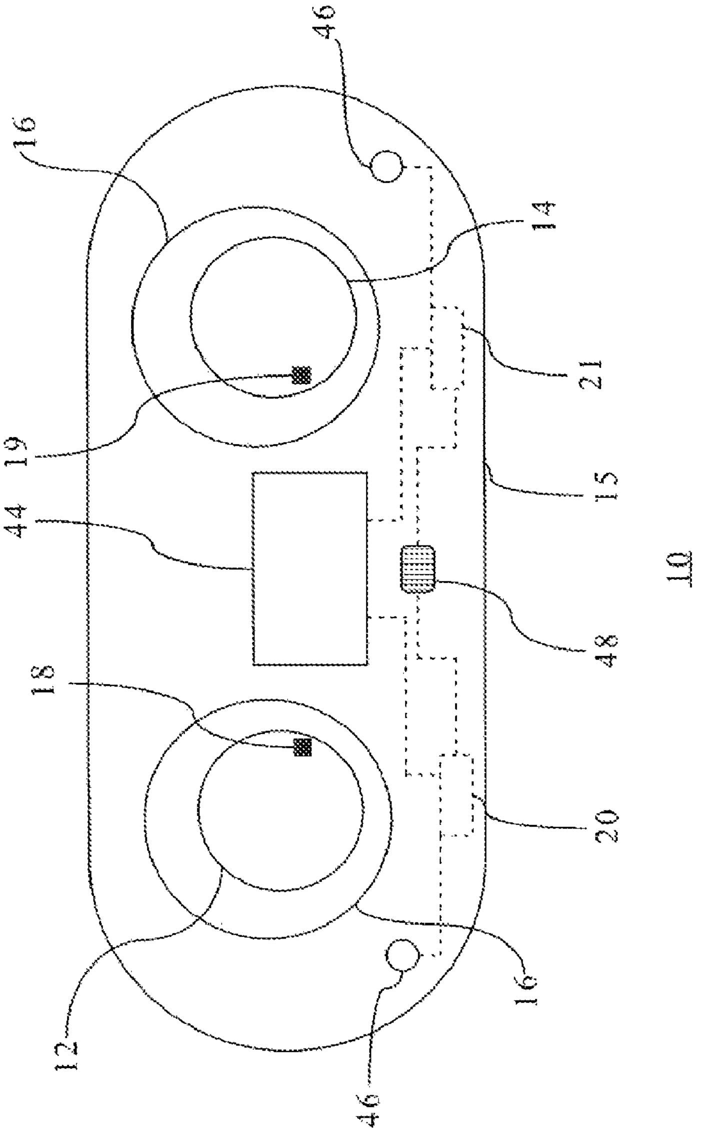
FIG. 1 is a schematic of a system for tracking the wearable life of a ophthalmic product, in a preferred embodiment.

Referring FIG. 1, there is shown a system 10 for tracking the wearable life of an ophthalmic product, such as prescriptive contact lenses 12, 14, in a container 15, in a preferred embodiment. Each lens 12,14 includes an anterior surface, an opposing posterior surface, an optical portion and a peripheral portion. The prescriptive contact lens 12 is disposed within a receptacle 16 of the container 15, while the prescriptive contact lens 12 is disposed within a receptacle 17 of the container 15, in a conventional manner. The container 15 has a substantially planar top surface and the receptacles 16,17 are generally concave when viewed from the side of the container 15. The receptacles 16,17 include a liquid medium, such as saline solution or any other suitable contact lens storing liquid.

Looking at FIG. 1, the lens 12 is prescribed for the user's left eye, hereinafter the left lens 12, includes at least one data carrier 18, and the lens 14 is prescribed for the user's right eye, hereinafter the right lens 14, includes at least one data carrier 19. The data carrier 18 or 19 may be any suitable means for retaining data operable in an electrical and/or magnetic mode, such as a radio identification (RFID) tag, as implemented in the preferred embodiment. The system 10 also includes at least one interrogation unit, such as, tag readers 20 and 21, which have the capability of reading data associated with the tags 18, 19 or writing data to the tags 18, 19. The contact lens 12, 14 can comprise any known material useful for making contact lenses, such as phemfilcon A, vifilcon A or tefilcon. The contact lenses may include any of the following basic types: soft, rigid gas permeable and hard. Thus, the container 15 has a left-reader 20 and a right-reader 21 associated with the lens container receptacles 16,17, respectively. The left lens 12 is identified as such by data on its associated RFID tag 18, and correspondingly the right lens 14 includes appropriate identification data on its associated tag 19.

For convenience, only the reader 20 will be discussed in operation with the RFID tag 18, since this operation is similar to the interaction between the reader 21 and RFID tag 19, and the reader 21 and RFID tag 19 include like elements to reader 20 and RFID tag 18.

Figure 2:
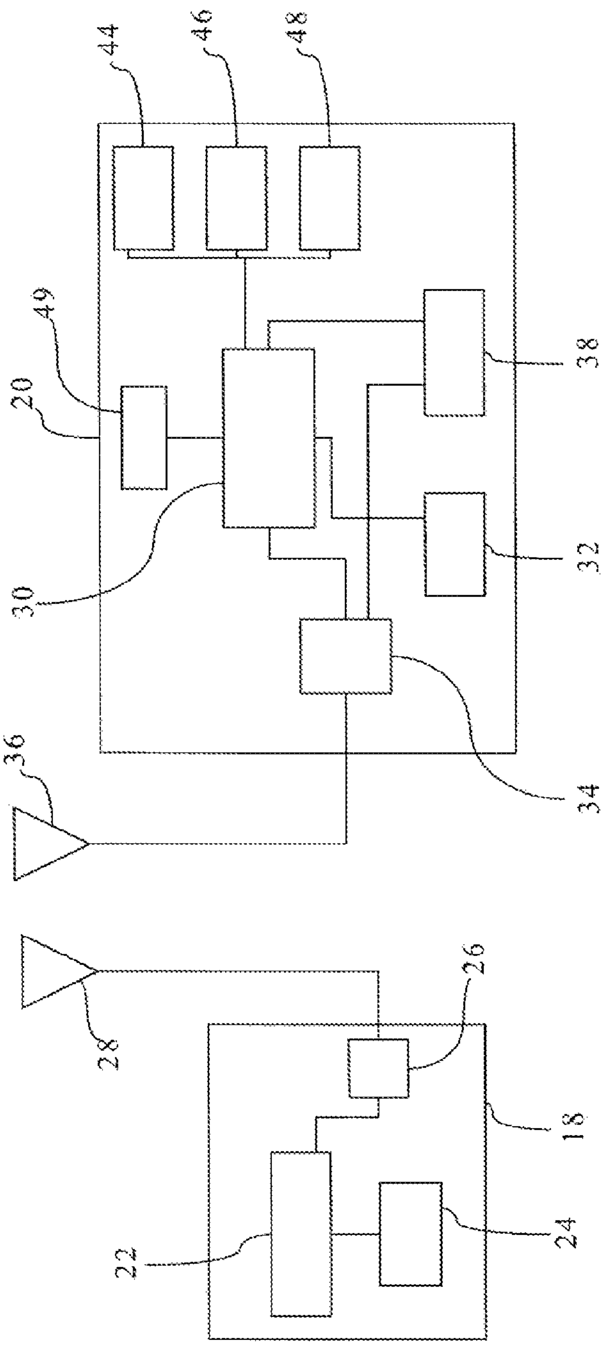
FIG. 2 is a block diagram of the system of FIG. 1.

More specifically, as shown in FIG. 2, an RFID tag 18 is illustrated in block diagram form, and includes processor module 22, a computer readable medium 24 or memory module, a transmitter/receiver module 26, and antenna module 28. The transmitter/receiver module 26 controls the communication of data to and from the external reader 20 via the antenna module 40. The computer readable medium 24 serves many functions including operating protocols and data storage. The computer readable medium 24 may include non-volatile programmable memory and/or volatile memory for data storage.

The computer readable medium 24 is used to accommodate security data and the RFID tag 18 operating system instructions which, in conjunction with the processor or processing logic performs the internal "house-keeping" functions such as response delay timing, data flow control and power supply switching. The computer readable medium 24 also facilitates temporary data storage during RFID tag 18 interrogation and response, and store the RFID tag 18 data and retains data when the RFID tag 18 is in a quiescent or power-saving "sleep" state. The memory module 24 may further include data buffers to temporarily hold incoming data following demodulation and outgoing data for modulation. The amount of memory provided can vary, and influences the size and cost of the integrated circuit portion of an RFID tag 18.

The RFID tag 18 operates within the RF portion of the electromagnetic frequency spectrum, such as 125 kHz, 13.56 MHz or 2.45 GHz, and uses any number of communication protocols. For instance, the tag 18 may include the contactless IC chip, which is manufactured by Hitachi, Japan, measuring 0.15×0.15 millimeter (mm), 7.5 micrometer (μm) thick or the μ-chip™ which features an internal antenna. These chips can thus operate entirely on their own, making it possible to use μ-Chip as RFID IC tags without the need to attach external devices, such as antennae, making these tags, or similar tags, ideal for application in the present invention. Similar to the 0.15 mm square chip, the μ-chip is manufactured by Hitachi, Japan, using silicon-on-insulator (SOI) fabrication process technology. The μ-chip operates at a frequency of 2.45 GHz, and includes a 128-bit ROM for storing a unique ID and may include a non-volatile memory. Typically, this type of tag, or similar, is small enough to be attached to, or embedded in a contact lens 12 or 14 without detriment to the user's vision, and nor does it cause comfort to the user. Other next-generation multi-band UHF-RFID tags with built-in antenna, such as UHF-RFID chips in 800 MHz-2.45 GHz frequency-range may be used, or any tags based on the EPCglobal standard, such as the EPCglobal UHF Generation 2 standard.

Also, as shown in FIG. 2, the reader 20 includes a processor module 30, a computer readable medium 32, a transmitter/receiver module 34, an antenna 36 and a power supply unit 38. The antenna module 36 is coupled to the transmitter/receiver module 34 to emit electromagnetic waves that are used to provide an interrogating field to the RFID tag 18. The reader 20 also includes an actuation means for powering on same, the actuation means may be require user intervention, or may be automatic. As such, the actuation means may include any of the following: switch, sensor, proximity switch (AC or DC inductive and capacitive), or reads triggered by a schedule, an external event or command.

Figure 3:
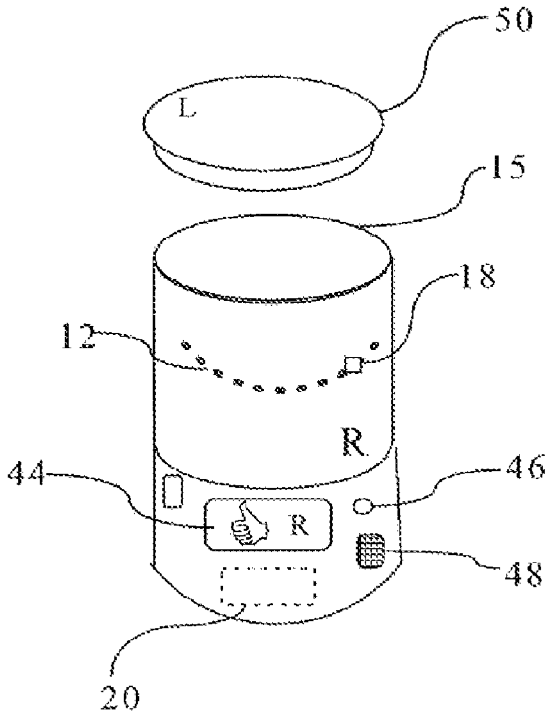
FIG. 3 is an example of a type of container for use with the system of FIG. 2.

The reader 20 includes an output such as display means such as a display 44 or LED(s) 46 for relaying information related to the tag 18 data, or a speaker 48 for outputting auditory signals or warnings. As a further example, FIG. 3 shows another type of container 15 with a reader 20, a display 44, an LED 46 and a speaker 48. The reader 20 can thus interrogate the tag 18, even when the lens 12 is in contact with liquid storage medium. The tag data includes an identification number or a unique ID used to identify the tag associated with a particular contact lens 12. Other data may include: SKU, manufacturer, logo, material of manufacture, composition, date of manufacture, lot. no., batch no., warehouse related data; promotional material (rebate for next pair purchase or free trials), lens features and benefits data, health warnings, data on potential risk or complications, insurance coverage data, regulatory data, authenticity data, encryption data, fitting details, lens type data, lens care or handling information, recommended usage information such as wear schedule, expiration data, URI., lot number, storing liquid medium, and so forth. The memory capacity on the memory module 32 of the reader 20 can be unlimited, and can be coupled to other memory modules on the devices such as flash memory, hard disk drive, Floppy, optical disks (DVDs, CDs etc. The RFID tag 18 may further include interface circuitry to direct and accommodate the interrogation field energy for powering purposes and triggering of the RFID tag 18 responses.

The reader 20 transmits activating signals or interrogation signals to the tag 18 automatically on a periodic basis. The reader 20 may also employ sleep modes to conserve power. The first instance the tag 18 is interrogated, the associated time/date of the first interrogation and any additional information may be written to the tag 18. Also, tag 18 data to a reader 20 in response to an interrogation request is written onto the tag 18 and/or the interrogator memory 32. Alternatively, since different users can have the same prescription for different eyes, then the lens 12 can be shipped from the manufacturer without designation as to which eye the lens is suited for. Instead, the tag 18 would include all other data such as SKU, manufacturer, manufacturing date, expiration date, authentication data, and so forth. An eye practitioner can then write the optometric data and/or prescription data, such as OS- or OD-designation, for each lens for the individual user, in accordance with the user's prescription. Alternatively, this data is written the first time the correct lens 12 or 14 is introduced in the correct receptacle 16 or 17. An eyecare practitioner or the user may perform this step.

When the lenses 12, 14 are re-introduced into the receptacles 16,17 for storage, for instance after being worn by the user, it is expected that the left lens 12 be stored in the receptacle 16 associated with the left reader 20, and the right lens 14 be stored in the receptacle 17 associated with the right reader 21. Therefore, the left reader 20 detects a tag 18 or 19 and processes the received tag data to determine whether the lens is a left lens 12. If the lens is indeed the left lens 12, then the left reader 20 outputs a signal indicative of a match to the user, otherwise the left reader 20 outputs a signal indicative of a no match or that the lens does not belong in that particular receptacle 16. The output signal may be in any form that provides a stimulus to a human body, such as visually, auditorily. For example, the visual output signal for a match or no match may include any number of messages with at least one character or at least one symbol or combination of characters and/or symbols or figures. Thus the messages can include any language or any widely accepted or predetermined symbols indicative of a positive state or a negative state. For example, the following messages may be used to indicate a match:

"MATCH", "Lens OK", "OK", "Yes", "1", "OUI", "EHE", "YEB0", "YE", Ano", "Ja", "Ken", "Si", "Tak", 正确。, כן, ☺, ✔, ✔yes, 👍.

As an example, the following messages may be used to indicate a non-match: "NO MATCH", "No", "0", "Ne", "Nyet", "Nee", "Nie", "Lo", "AIWA", "KWETE", 错误。, לא, ✖, ✖No, ⃠, ⊖, 👎.

The output signals may be in the form of visible signals such as light from an LED 46. The LED 46 may output a particular visible signal depending on the outcome of the match/non-match determination, or may emit a visible signal with a particular duty cycle, such as 30 percent for a match and 90 percent for a non-match. For example, a match can be indicated by an LED 46 that is on permanently for a predetermined time, while or a non-match can be a flashing LED 46, such that the two states are clearly distinguishable. The LED 46 may be blinked on and off in a binary code pattern or Gray code pattern. By using the Gray code pattern each LED 46 is turned on and off in turn for only one cycle of a predetermined repeated pattern.

In the instance of output signals are in the form of audible signals, a piezo-electric speaker 44 outputs a particular audible signal depending on the outcome of the match/non-match determination. For example, the audible signal may a message or phrase in any language indicative of a positive state or a negative state, such as "MATCH", "Lens OK", "OK", "Yes", "OUI", "EHE", "YE", "EHE", "YEB0", "YE", Ano", "Ja", "Ken", "Si", "Tak" for a match, or "NO MATCH", "No", "0", "Ne", "Nyet", "Nee", "Nie", "Lo" "AIWA", "KWETE", for a non-match. Also, the piezo-electric speaker 44 may emit an audible signal with a particular duty cycle of indicative of a positive state or a negative state, such as a fast beeping sound for a non-match and a slow beeping sound for a match. However, these messages may include both visual signals and audible signals. Advantageously, audible signals are beneficial where ambient light conditions are poor or when vision is impaired temporarily, or when a visual aid is required to read the output display When already stored with the container 15, the user can verify the identity or characteristics of the lens 12 by referring to the output signal. For example, the reader 20 is enabled by the user manually or automatically upon sensing the user's proximity to the container 15 through electrostatic means, and so forth.

Preferably, it is preferred that the data carrier, such as an RFID tag 18, be located on a contact lens 12 in a predetermined area which does not face the cornea, or is in the non-optical portion of the lens 12, such as the peripheral portion. Typically, the RFID tag 18 is located and dimensioned so that it does not interfere substantially with the lens 12 configuration or alter the prescription, or cause the lens to deteriorate. As such, the tag 18 does not irritate the eye of the lens wearer or give any discomfort.

Figure 4:
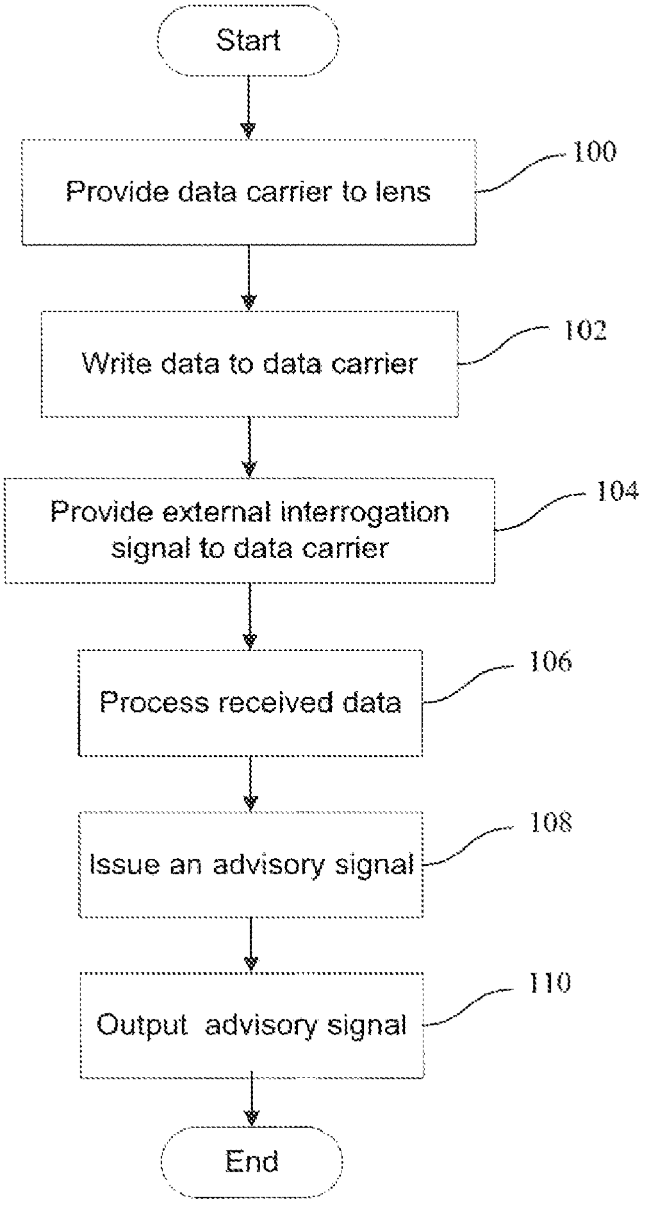
FIG. 4 is a flowchart outlining the steps for tracking the wearable life of the ophthalmic product.

The reader 20 tracks the wearable life of a lens 12 and predicts impending expiry of the lens 12. Prolonged use of the expired lenses may cause discomfort, inflammation, swelling, abrasion, or another problem that could, in rare cases, result in permanent eye tissue damage. The method for determining the wearable life of a lens of a contact lens data will now be described, with reference to the flowchart of FIG. 4. The method includes the step of providing an identifying means comprising a data carrier with the contact lens 12, in step 100. The data carrier includes a device 18 operable in a magnetic and/or electrical mode, such as an RFID tag. The contact lens 12 is embedded with an RFID tag 18 at manufacture, or included with the lens 12 post manufacture by any suitable attachment means, and data, such as: expiration data, SKU, manufacturer, authentication data, date of manufacture, is written onto the memory 24 of the RFID tag 18, in step 12.

Alternatively, the contact lens 12 is provided with an RFID tag 18 at the dispensing point or point-of-sale (POS) by an eyecare practitioner, such as, optometrists, ophthalmologists and opticians, or at the operating point by the user. Therefore, the eyecare practitioner can write additional information onto the tag, in addition to the data already written at manufacture, such as, data related to a typical contact lens prescription, for example:

OS—

Brand name: Riffed Lens

BC: 8.2

DIA: 14.2

POWER: −3.50

OD—

Brand Name: Riffed Lens

BC: 8.2,

DIA: 14.2

POWER: −2.00

CYL & AXIS: −1.75×90°

The BC or base curve—measure of curvature with regard to the contact lens and in most cases this decimal figure is the same for both the left and the right eyes.

DIA or DIAM.—decimal figure for a measure of the diameter of the contact lens

POWER—the lenses' power (sometimes also called the sphere or Rx number) is either written in a "positive" (+) or "negative "−"format and can range from between −20.00 to +20.00.

CYL refers to the strength of the patients astigmatism and is represented by a + or − number. The AXIS provides information on the "orientation" of the astigmatism and can anything between 0 and 180 degrees. Other data may include prescribing eyecare practitioner, filling pharmacy, health professional information, date & time the prescription was filled, lens user's personal details, prescription information, right eye/left eye identification data, fitting details, and so forth. However, if any of the afore-mentioned data that may be written at manufacture is not present on the tag 18, then this data may now be written onto the tag 18.

Next, an activation signal is provided from an external means, such as a reader 20, in step 104. The RFID tag 18 is thus energized by the activation signal to cause the RFID tag 18 to emit data in response to the activating signal. The time when the contact lens 12 is first interrogated by the reader 20 is recorded, this time may corresponds to the time the contact lens 12 is first introduced into the container 15. The transceiver 26 receives the data and the processor module processes the received data, in step 106.

A counter 49 provided with the system 10 counts the elapsed time from that first instance of interrogation and notifies the logic means when a particular time threshold has been reached, close to be reached or surpassed. For example, the recommended period of wear may be expressed in hours or days. The processor module 30 the issues an advisory signal associated with the contact lens 12, in step 108. The user can be notified of impending expiry, and actual expiry, of the lens 12 via an advisory signal means, either visually or auditorily or some other a stimulus to a human body, step 110. At this time, the user may be prompted to seek a new prescription or obtain a new lens or lens pair. The system may also inform the user the minimum period the contact lens should be left out of the eye before re-insertion, or the recommended number of times, if any, that the contact lens should be cleaned.

Alternatively, the system uses the expiration data, which may be expresses in a month/day/year (MM/DD/YYYY) format to determine the wearable life of the lens by comparing the expiration data to contemporaneous data related to the interrogation by the reader 20. As such, the reader 20 includes a real time clock.

The system 10 may issue advisory signals visually, such as "Lens Expired", "Change Lens", "Remove Lens Daily", Store Lens for 5 hrs each day", "Clean Lens", "45 Days left", "New Rx required" messages or a plethora of symbolic messages. The advisory signal means may also be audible. The system can output the advisory signals automatically or the user can query the system 10, using an interactive display or buttons coupled to the reader 20.

Figure 5:
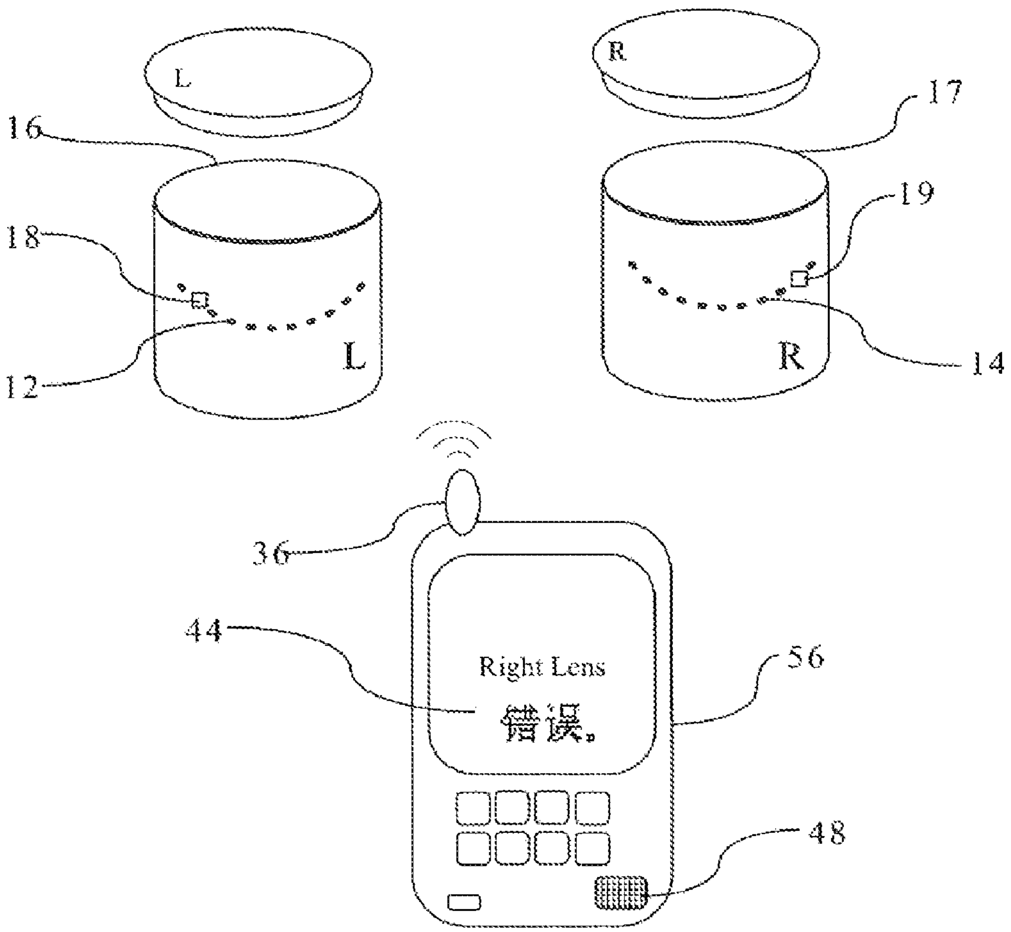
FIG. 5 is a perspective view of a system for tracking the wearable life of the ophthalmic product, in another embodiment

In another embodiment, the reader 20 is integrated in a computing device 56, as shown in FIG. 5. Typically, a computing device 56 includes a processing unit, a computer readable medium including ROM, flash memory, non-volatile RAM, a magnetic disk, an optical disk, an IC memory card or a magnetic tape, input/output means. Also, the computing devices 56 execute an operating system on the computer-readable medium such as Microsoft® Windows 9X, Me, XP, Windows CE, UNIX®, LINUX®, Pocket® PC OS or Palm OS®. Also included in the computer-readable medium is a set of instructions for performing the functions related to the system 10 or the operation of the computing device 56. For example, the system 10 provides a computer program product encoded in a computer-readable medium including a plurality of computer executable steps for a computing device 56 to determine the identity of a lens 18 or 19. The computing devices 56 are, but not limited to, personal computers, handheld devices, mobile computing devices, personal digital assistants (PDAs), mobile phones, pagers and microprocessor-based wireless information devices. In this case, the input/output means for interacting with the system 10 are embodied within the computing device 56, such as the graphical user interface, an LCD display, a touch screen display, buttons, a microphone, and a speaker. Alternatively, the reader 20 can be added onto any of the afore-mentioned devices 56 as a peripheral.

In another embodiment, a reader 20 resident on the container 15 includes a network interface for coupling to a computing device 56 or network. The reader 20 may be coupled via a wired or wireless connection, such as Ethernet, IEEE 1394, TDMA, CDMA, GSM, PTSN, ATM, ISDN, 802.1X, USB, Parallel, Serial, UART (RS-232C). In this case, the input/output means for interacting with the system 10 are embodied within the computing device, such as the graphical user interface, LCD display, buttons, touch screen display, microphone, and speaker. Alternatively, the reader 20 is a standalone handheld device coupled to a computing device or network.

For example, a mobile device, such as a PDA or phone, with a reader 20 (integrated or peripheral) employs the PDA display for input of queries from a user and output of visual messages, including buttons for input and interacting with the system 10. Also, the PDA's or phone's speaker allows for audible output signals and a microphone allows for audible query input signals using suitable speech recognition means and speech processing means. Alternatively, the system 10 issues advisory signals, such as reminders, alerts & warnings, to the user and third parties, such as, eye-care practitioners, pharmacy or central server/database via the wired or wireless network. The third parties can issue alerts to the user via any predetermined mode of communication with user, such as telephone, voice-mail, fax, email, SMS, MMS, snail mail, courier, and so forth. Depending on the nature of the advisory signals, the third party may automatically fill a new prescription for replacement lens and send them to the user, or may seek user intervention before filling the new prescription, in accordance with user-determined lens replacement rules. Such advisory signals may also be used for a container 15 with limited display capabilities or a reader 20 coupled to a computing device with limited computing resources.

The third party may also analyse the received data and track the amount of time the lenses are actually worn by the user, and compile reports or graphs. The third party may thus determine whether the prescription is being followed, for example if dailies are worn for more than 24 hrs, or whether overnights are being worn beyond the prescribed maximum time period, such as 30 days. Also, not every user can reach the maximum wear time of 30 continuous nights. In a U.S. clinical study, 1000 of the 1300 users completed a full year of lens wear, with 67% of them wearing the lens between 22 to 30 days. Therefore, the third party may recommend a shorter wearing time depending on the user's individual needs, using the received data. The reports or graphs may also be issued to the user and any other interested parties such as insurance companies.

The reader 20, either standalone or attached or integrated in the computing device, may be coupled to another computing device or network to enable a user to order a pair of lenses, for example, when the lens are nearing expiration, have expired, or have been damaged. Through the input/output means for interacting with the system 10, a user may place carry out a transaction for the purpose of ordering or purchasing lens from a pharmacy, retailer or virtual store for a replacement lens or pair, based on the data stored on the tag, such as Rx, patient details, shipping address, eyecare practitioner info, and so forth. The reader 20 connects via a wired or wireless connection to the appropriate pharmacy, retailer or virtual store to carry out a commercial transaction. The transaction is charged to the user credit card or any other payment means such as PayPal, e-check, debit cars, C.O.D., and so forth. In one example, the system 10 includes an RFID-NFCenabled mobile device, capable of ordering a pair of lenses. Using account information stored in the mobile device the user can automatically place an order to a pharmacy or retailer for a replacement lens or pair, based on the data stored on the tag, such as Rx, patient details, shipping address, eyecare practitioner info, and so forth. The reader 20 within the mobile device, or wallet phone, automatically connects via the cellular connection or through NFC-enabled Wi-Fi or Bluetooth to the appropriate Web site to carry out a commercial transaction. The transaction is charged to the user credit card or any other payment means such as PayPal, e-check, debit cars, C.O.D., and so forth. Alternatively, the lenses 12 and 14 may be ordered automatically by the system upon determination of impending expiry of the lenses, or in accordance with predetermined lens replacement rules stored in a computer readable medium.

In another embodiment, the system 10 includes one reader 20 for reading the tags 18 or 19 on the right lens 14 and the left lens 12. The reader 20 includes the capability of distinguishing which receptacle 22 or 24 is being read. For example, the reader 20 includes two antennae 28 coupled to a transceiver 26, with one antenna 28 adjacent to the receptacle 22 and another antenna 28 adjacent to the receptacle 24. The antennae 28 and the tags 18, 19 are configurable to have minimal interference or collisions, such that each lens 12 or 14 is identified based on which antenna 28 is radiating the interrogation signals and receiving the tag responses.

In yet another embodiment, the RFID tag 18 is active. Thus, the active tag 18 incorporates an additional energy source, such as a battery, into the tag construction. This energy source permits active RFID tag 18 to create and transmit strong response signals even in regions where the interrogating radio frequency field is weak, and thus an active RFID tag 18 can be detected at greater range. Those skilled in the art, however, will recognize that active and/or passive tags 18 share many features and that both can be used with this invention. Alternatively, the RFID tag 18 is semi-active, in that it uses an additional energy source, such as a battery, and the energy derived from the external means, such as a reader 20.

In yet another embodiment, the tag 18 includes an 'internal' antenna module 28 by having a coil antenna is formed directly on the surface of the chip, such as Coil-On-Chip™ technology from Maxell, Japan. Therefore, no outside antenna is required.

In yet another embodiment, the system 10 employs Near Field Communication (NFC) technology, a very short-range radio frequency identification (RFID) protocol that provides secure communications between various devices. NFC is also compatible to the broadly established contact less smart card infrastructure based on ISO 14443 A, such as the Philips MIFARE™ technology by Philips, Holland, as well as Sony's FeliCa™ card from Sony, Japan. NFC operates in the 13.56 MHz frequency range, over a distance of typically a few centimeters. By having this relatively short read distance, security is enhanced as this substantially diminishes the possibility of eavesdropping or man-in-the middle attacks. NFC technology is standardized in ISO 18092, ISO 21481, ECMA (340, 352 and 356) and ETSI TS 102 190. In an NFC-enabled mobile device 56, such as a mobile phone, the reader 20 is powered by the batteries within a mobile phone 56 to allow communication with an NFC tag 18 on a lens 12.

In yet another embodiment, communication may be accomplished between the reader 20 and a tag 18 via different media or frequencies for different purposes (e.g., infrared light, or acoustics).

In yet another embodiment, communication may be accomplished between the reader 20 and a tag 18 via different media or frequencies for different purposes (e.g., infrared light, or acoustics).

In yet another embodiment, the RFID-tagged contact lenses 12 or 14 or containers 15 can be tracked more precisely by manufacturers and distributors as they move through the supply chain.

In another embodiment, the system 10 includes a method for tracking the wearable life left in a contact lens or pair of contact lenses.

In another embodiment, the ophthalmic product is a prescription lens for eyeglasses comprising an identifying means, wherein the identifying means has a data carrier comprising a first device operable in a magnetic and/or electrical mode to emit data associated with the prescription lens in response to activation by an activating signal applied by an external means. Oftentimes, when a wearer of the eyeglasses needs to replace the eyeglasses, for any number of reasons such as theft, misplaced, scratched lens, broken lens, but may be have been misplaced or lost the eyecare practitioner issued valid prescription. Generally, the wearer has to arrange for a new eye examination with the eyecare practitioner, or have the prescription of existing broken or scratched lenses to be test with complicated instruments, such as a phoropter, if there is no record of the existing and valid prescription. However, in the case where the wearer is still in possession of the scratched lens or broken lens, the prescription data can be readily determined and verified with the wearer thus foregoing a costly eye-examination or determination of the prescription of existing glasses by complicated instruments.

In another embodiment, the ophthalmic lens is an intraocular lens or an implantable collamer lens (ICL).

In yet another embodiment, the system 10 supports various security features that ensure the integrity, confidentiality and privacy of information stored or transmitted, such as: (a) mutual authentication—where the tag 18 can verify that the reader 20 is authentic and can prove its own authenticity to the reader 20 before starting a secure transaction; (b) strong information security—for complete data protection, information stored on tag 18 can be encrypted and communication between the tag 18 and the reader 20 can be encrypted to prevent eavesdropping. The authentication data of the contact lens 18 is verified with the logic means or external means to help combat counterfeiting. Additional security technologies may also be used to ensure information integrity. Additionally, the tag 18 may include built-in tamper-resistance by employing a variety of hardware and software capabilities that detect and react to tampering attempts and help counter possible attacks. The system 10 may also include the ability to process information and uniquely provide authenticated information access and protect the privacy of personal information. The tag 18 can verify the authority of the information requestor 20 and then allow access only to the information required. Access to stored information can also be further protected by a challenge-response scheme, such as a personal identification number (PIN) or biometric to protect privacy and counter unauthorized access.

In another embodiment, the tag 18 is passive such that the data is written during the fabrication process using ROM (Read-Only-Memory). Since it is impossible to rewrite the data, this provides a high level of security and authenticity. Upon purchase of the lens with the passive tag 18, the data, such as, the unique ID, is associated with the prescription details. Therefore, the unique ID used to perform a lookup in a secure system, and no unique personal information about the user is present within that unique ID. As described above, a reader 20 with a network interface is coupled to a computing device 56 or network to access the data record with the unique ID. Therefore, as an example, the unique ID may be associated with a right lens or a left lens, such that the invention can be practiced as described above.

In another embodiment, the container 15 will only accept known lens, for example, at the reader 20 reads the lens identification data when the lens is first introduced in the container 15, and stores that lens identification data. The next a lens is introduced in that lens container 15, the reader 20 verifies whether the lens bears the lens identification data, if there is a match then a signal indicative of this outcome is issued. This situation is useful in a case where there is more than one container 15 in an environment, such as a household bathroom, changing room or locker room, where there exists a chance a user may choose another user's container 15 by mistake.

In another embodiment, the container 15 is releasably locked depending on the wearable life of the lenses. For example, following a predetermined number of advisory signals imploring the user to replace the lenses or seek a new prescription, the container 15 is locked, and can only be opened after resetting the lock, or by the introduction of a lens 12 with valid data.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method for tracking the wearable life of an ophthalmic product, said ophthalmic product having expiration data, said method comprising the steps of:

providing on or within said ophthalmic product at least one data carrier for carrying data related to said ophthalmic product, said data carrier having a first device operable in a magnetic and/or electrical mode;

providing an activation signal from an external means;

activating said first device with said activation signal to cause said first device to emit said data in response to said activating signal;

recording said time said first device is activated;

processing said received data to determine the wearable life of said ophthalmic product, based on the lapsed time between said time of activation and said expiration data; and wherein said ophthalmic product is one of a contact lens, an intra-ocular lens, or a lens for eyeglasses.

2. The method of claim 1 wherein the first device is an RFID tag.

3. The method of claim 2 wherein said external means comprises a second device for emitting said activating signal in an electric and/or magnetic mode, said second device including a transmitter and/or receiver, wherein said second device is included with any of the following: an ophthalmic product container, a mobile device, a handheld device, a computing device, a standalone transceiver, a standalone transceiver coupled to a network, a standalone transceiver coupled to a computer.

4. The method of claim 3 wherein said data comprises any of the following: SKU, unique ID, manufacturer, logo, material of manufacture, composition, lot, no., batch no., warehouse related data; promotional material, rebate for next pair purchase or free trials, lens features and benefits data, health warnings, data on potential risk or complications, insurance coverage data, regulatory data, authenticity data, fitting details, lens type data, lens care or handling information, recommended usage information such as wear schedule, filling pharmacy, health professional information, time, an ophthalmic product user's personal details, prescription information, right eye/left eye identification data, URI.

5. The method of claim 4 wherein said external means issues an advisory signal based on a predetermined time threshold related to said time of activation and/or said expiration data.

6. The method of claim 5 wherein said advisory signal is provided visually or auditorily.

7. A system for tracking the wearable life of an ophthalmic product, the system comprising:

said ophthalmic product having thereon or within it a data carrier for carrying data related to said ophthalmic product, said data comprising expiration data, said data carrier having a first device operable in a magnetic and/or electrical mode to emit said data in response to activation by an activating signal applied by an external means;

said external means having receiving means for receiving said emitted data, counter means for recording the time of activation, and logic means for processing said received data to determine the lapsed time between said time of activation and expiration data, wherein the wearable life of an ophthalmic product is based on said lapsed time, and wherein said ophthalmic product is one of a prescription contact lens, a prescription lens for eyeglasses, or an intra-ocular lens.

8. The system of claim 7 wherein the first device is an RFID tag.

9. The system of claim 8 wherein said counter means provides data associated with elapsed time.

10. The system of claim 9 wherein said external means includes a second device for emitting said activating signal in an electric and/or magnetic mode, said second device including a transmitter and/or receiver, wherein said second device is included with any of the following: a contact lens container, a mobile device, a handheld device, a computing device, a standalone transceiver, a standalone transceiver coupled to a network, a standalone transceiver coupled to a computer.

11. The system of claim 10 wherein said determination of lapsed time is tracked automatically.

12. The system of claim 11 wherein said counter means is reset upon interrogation of the ophthalmic product not previously interrogated by said external means.

13. The system of claim 12 wherein an advisory signal is issued based on at least one of said lapsed time, or a predetermined time threshold.

14. The system of claim 13 wherein said data carrier includes any of the following: SKU, unique ID, manufacturer, logo, material of manufacture, composition, lot, no., batch no., warehouse related data; promotional material, rebate for next pair purchase or free trials, lens features and benefits data, health warnings, data on potential risk or complications, insurance coverage data, regulatory data, authenticity data, fitting details, lens type data, lens care or handling information, recommended usage information such as wear schedule, filling pharmacy, health professional information, time, an ophthalmic product user's personal details, prescription information, right eye/left eye identification data, URI.

15. The system of claim 14 wherein a commercial transaction for the purpose of ordering or purchasing an ophthalmic product is conducted via said external means coupled to a network.

16. The system of claim 15 wherein data related to the ophthalmic product and contemporaneous data related to the recording activation time forms historical data related to the use of the ophthalmic product, wherein said historical data is stored in a computer readable medium, and/or transmitted to said external means coupled to a network to a third party.

17. The system of claim 16 wherein said third party issues advisory signals to the ophthalmic product user or issues an ophthalmic product based on the historical data, and/or initiates a transaction based on the historical data.

18. A system for automatically tracking the wearable life of an ophthalmic product, the system comprising:

said ophthalmic product having thereon or within it a data carrier for carrying expiration data related to said ophthalmic product, said data carrier being operable in a magnetic and/or electrical mode;

a reader for interrogating said data carrier to acquire said expiration data;

a clock for tracking time;

a processor for determining wearable life of said ophthalmic product based on the clock time and the expiration data, and providing advisory signals based on said determination; and at least one output means for outputting said advisory signals, and wherein said ophthalmic product is one of a prescription contact lens, a prescription lens for eyeglasses, or an intra-ocular lens.

19. The system of claim 18 wherein said data carrier includes any of the following: SKU, unique ID, manufacturer, logo, material of manufacture, composition, lot, no., batch no., warehouse related data; promotional material, rebate for next pair purchase or free trials, lens features and benefits data, health warnings, data on potential risk or complications, insurance coverage data, regulatory data, authenticity data, fitting details, lens type data, lens care or handling information, recommended usage information such as wear schedule, filling pharmacy, health professional information, time, an ophthalmic product user's personal details, prescription information, right eye/left eye identification data, URI.

20. The system of claim 19 wherein said system includes a counter means wherein said counter means provides data associated with elapsed time.

* * * * *